(12) United States Patent
Murata et al.

(10) Patent No.: US 9,987,932 B2
(45) Date of Patent: Jun. 5, 2018

(54) BATTERY SYSTEM

(71) Applicant: Toyota Jidosha Kabushiki Kaisha, Toyota-shi Aichi-ken (JP)

(72) Inventors: Takashi Murata, Kasugai (JP); Yusuke Kuruma, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 71 days.

(21) Appl. No.: 15/354,019

(22) Filed: Nov. 17, 2016

(65) Prior Publication Data

US 2017/0136900 A1    May 18, 2017

(30) Foreign Application Priority Data

Nov. 18, 2015 (JP) ................................. 2015-225890

(51) Int. Cl.

| | |
|---|---|
| H02J 7/00 | (2006.01) |
| B60L 11/18 | (2006.01) |
| H01M 10/625 | (2014.01) |
| H01M 10/615 | (2014.01) |
| H01M 2/10 | (2006.01) |

(52) U.S. Cl.
CPC ......... B60L 11/1809 (2013.01); B60L 11/187 (2013.01); B60L 11/1816 (2013.01); B60L 11/1844 (2013.01); B60L 11/1861 (2013.01); B60L 11/1862 (2013.01); B60L 11/1875 (2013.01); H01M 2/1083 (2013.01); H01M 10/615 (2015.04); H01M 10/625 (2015.04); H02J 7/007 (2013.01); H02J 7/0021 (2013.01); *B60L 2210/10* (2013.01); *B60L 2240/545* (2013.01); *Y02E 60/721* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| | | | |
|---|---|---|---|
| 2012/0235687 A1* | 9/2012 | Abe ...................... | H02J 7/0021 324/537 |
| 2017/0018817 A1* | 1/2017 | Simmonds ............ | H02J 7/0026 |
| 2017/0057376 A1 | 3/2017 | Murata | |

FOREIGN PATENT DOCUMENTS

| | | |
|---|---|---|
| FR | 2992101 A1 | 12/2013 |
| JP | 2012178899 A | 9/2012 |
| JP | 2015159633 A | 9/2015 |
| WO | 2014167914 A1 | 10/2014 |
| WO | 2015124993 A1 | 8/2015 |

* cited by examiner

*Primary Examiner* — Arun Williams
(74) *Attorney, Agent, or Firm* — Dinsmore & Shohl LLP (57) ABSTRACT

A battery system includes: a power detector that detects output power from an external power source; a charging mechanism that charges a main battery by external power; a temperature raising mechanism that raises a temperature of the main battery to a temperature not lower than a reference temperature; and a controller that controls the charging mechanism and the temperature raising mechanism, wherein when the detected output power is lower than a reference power, the controller prohibits a temperature raising process with an SOC of the main battery lower than a charge reference value and performs a charging process.

10 Claims, 8 Drawing Sheets

BATTERY SYSTEM

CROSS REFERENCE TO RELATED APPLICATION

The entire disclosure of Japanese Patent Application No. 2015-225890 filed on Nov. 18, 2015 including the specification, claims, drawings, and abstract is incorporated herein by reference in its entirety.

TECHNICAL FIELD

The present disclosure relates to a battery system provided with a vehicle-mounted battery that supplies power to a rotary electrical machine for traveling and is rechargeable by external power supplied from an external power source.

BACKGROUND

In the related art, electric vehicles such as electric cars or hybrid cars that travel by using motive power from a rotary electrical machine are widely known. The electric vehicles are normally provided with a battery that supplies power to the rotary electrical machine. The battery may be charged by external power supplied from an external power source. In order to perform external charging, the electric vehicle is brought into a plug-in state in which a charging plug provided on the electric vehicle is connected to the external power source.

It is known that the battery's performance is lowered when the temperature is excessively low. Therefore, in the related art, if the temperature of a battery is low at the time of the external charging, a battery temperature raising process is performed in parallel to a battery charging process (For example, see JP 2015-159633 A).

The maximum output power of the external power source differs depending on the type of facility, country, region, and the like where the external power source is installed. For example, the maximum output power supplied from the external power source is prescribed by a law of each country or by private standards (for example, JEAC, etc.), and there are some countries in which the maximum output power of the external power source is low. In addition, there are many countries and regions in which power quality is low, and thus there is often a case where a nominal power fails to be supplied.

If the charging and temperature raising processes are performed in the same manner as in a case where output power from the external power source is high when the output power from the external power source is low as described above, the charging process and the temperature raising process might fail to be adequately performed. For example, when a plug-in connection is established, the battery system normally starts charging the vehicle-mounted battery and, if necessary (if the battery temperature is low), also starts raising the battery temperature. However, when the charging and temperature raising processes are performed in parallel in a state in which the maximum output power from the external power source is low, power which can be used for charging the battery is significantly lowered, and thus a significant increase in time required for completing the charging process may result.

JP 2012-178899 A discloses a technology in which a threshold temperature is set in accordance with the maximum output power from the external power source, and if the battery temperature is not lower than the threshold temperature, only the charging process is performed without raising the temperature, and if the battery temperature is lower than the threshold temperature, only the temperature raising process is performed without charging the battery. According to this technology, the charging and temperature raising processes are not performed simultaneously.

According to JP 2012-178899 A, when the battery temperature is low, the temperature raising process is given priority over the charging process. However, when the plug-in connection is established, a user generally wants to charge the battery, but not raise the temperature. According to the technology disclosed in JP 2012-178899 A, when the battery temperature is low, the priority is given to the temperature raising process over the charging process against the intention of the user. Consequently, the battery may fail to be charged rapidly.

SUMMARY

Accordingly, embodiments of the present disclosure provide a battery system in which a battery is charged rapidly upon establishment of a plug-in connection even when an output power from an external power source is low.

A battery system disclosed in the present application is a battery system including a vehicle-mounted battery that supplies power to a rotary electrical machine for traveling and is rechargeable by external power supplied from an external power source, the battery system including: a power detection mechanism that detects output power from the external power source in a plug-in state in which the external power source is connected to the vehicle-mounted battery; a charging mechanism that charges the vehicle-mounted battery by the external power; a temperature raising mechanism that raises a temperature of the vehicle-mounted battery to a temperature not lower than a prescribed reference temperature; and a control unit that controls the charging mechanism and the temperature raising mechanism, wherein in a low-power state in which the output power detected by the power detection mechanism is lower than a prescribed reference power, the control unit prohibits a temperature raising process by the temperature raising mechanism with an SOC (state of charge) of the vehicle-mounted battery lower than a prescribed charge reference value, and causes the charging mechanism to perform a charging process.

In this configuration, rapid charging to the charge reference value is achieved even in the low-power state.

In the low-power state, the control unit may cause the charging mechanism to charge the vehicle-mounted battery until the SOC of the vehicle-mounted battery reaches a charge stop value which is higher than the charge reference value, and then if the temperature of the vehicle-mounted battery is lower than the reference temperature, cause the temperature raising mechanism to start the temperature raising process.

In this configuration, the temperature raising process may be started in a state in which surplus power required for the temperature raising process is secured.

In the low-power state, if the SOC of the vehicle-mounted battery is lowered to a level below the charge reference value during the temperature raising process by the temperature raising mechanism, the control unit may stop the temperature raising process by the temperature raising mechanism, and charge the vehicle-mounted battery to the charge stop value by the charging mechanism.

In this configuration, the SOC is prevented from lowering to a level below the charge reference value.

The control unit may cause the vehicle-mounted battery to be charged by the charging mechanism after completion of the temperature raising process by the temperature raising mechanism until the SOC of the vehicle-mounted battery reaches the charge stop value.

In this configuration, the control unit may wait in a state of having a surplus power over that required for the temperature raising process.

The control unit may perform the charging process by the charging mechanism and the temperature raising process by the temperature raising mechanism in parallel in a normal power state in which the output power detected by the power detection mechanism is not lower than the reference power.

In this configuration, when a surplus of power remains in the normal power state, both of the temperature raising process and the charging process may be completed rapidly.

According to the configuration disclosed in this application, rapid charging to the charge reference value may be achieved even in the low-power state. Consequently, the intention of the user who has connected the vehicle via the plug-in connection is achieved further rapidly.

BRIEF DESCRIPTION OF DRAWINGS

Embodiment(s) of the present disclosure will be described by reference to the following figures, wherein.

DESCRIPTION OF EMBODIMENTS

Figure 1:
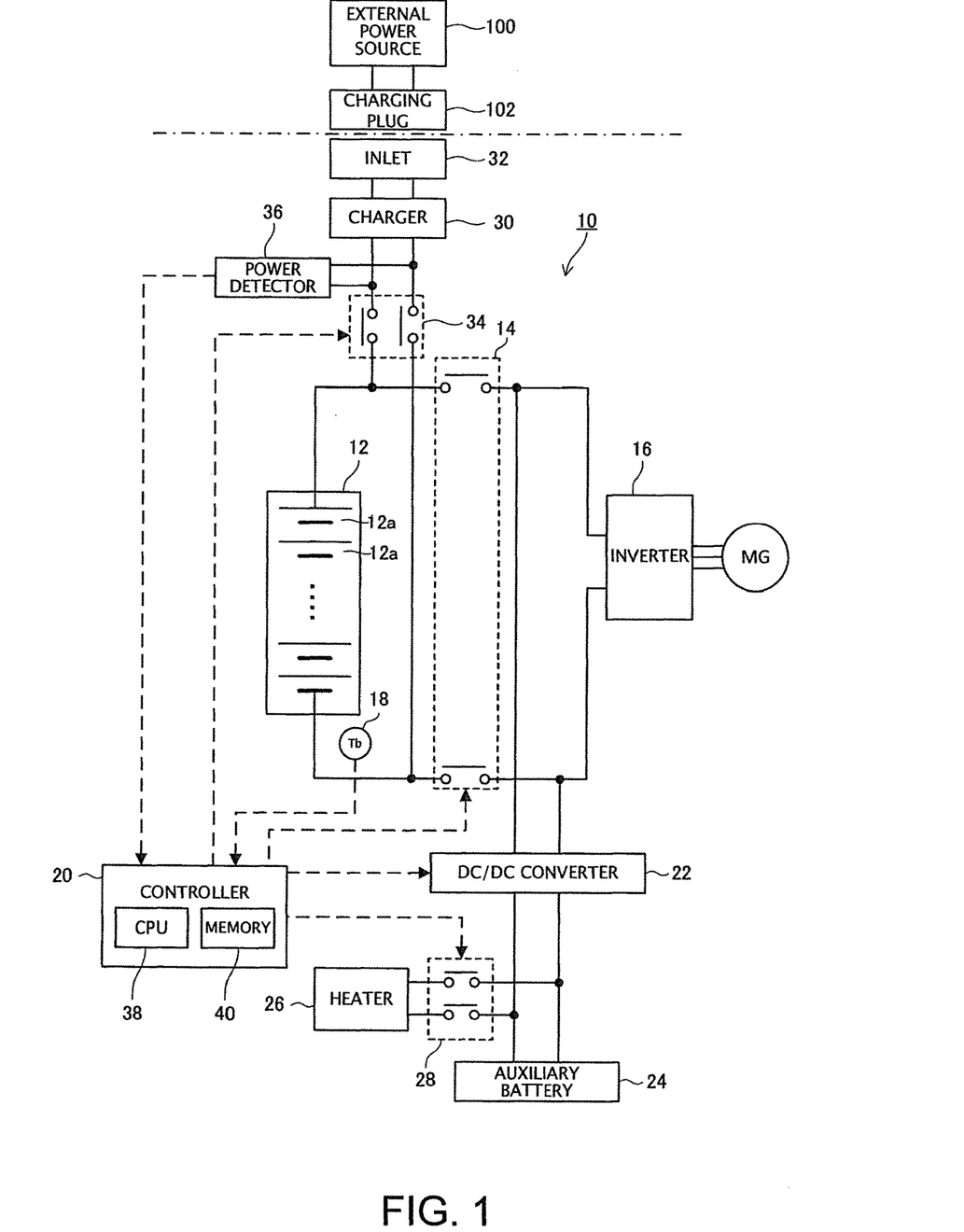
FIG. 1 is a block diagram illustrating a configuration of a battery system.

Referring now to drawings, embodiments will be described below. FIG. 1 is a drawing illustrating a schematic configuration of a battery system 10 according to embodiments. The battery system 10 is mounted on an electric vehicle provided with a rotating electrical machine MG as a motive power source of the vehicle. Examples of the electric vehicle include electric cars that travel only by a motive power from the rotating electrical machine MG, and hybrid cars that travel by motive powers from the rotating electrical machine MG and an engine.

The battery system 10 includes a main battery 12 that charges and discharges power, a charging mechanism that charges the main battery 12 by external power, a temperature raising mechanism that raises the temperature of the main battery 12, and a controller 20 that controls driving of these members. The main battery 12 includes a plurality of electrical cells 12a connected in series. Examples of the electrical cells 12a that may be used here include secondary batteries such as nickel hydride batteries and lithium ion batteries. An electric double-layer capacitor may be used instead of the secondary batteries. A configuration of the main battery 12 may include the plurality of electrical cells 12a connected in parallel.

The main battery 12 is connected to an inverter 16 via a system main relay 14. The system main relay 14 is switched between ON and OFF by the controller 20. When the system main relay 14 is turned ON, the inverter 16 and a DC/DC converter 22 are electrically connected to the main battery 12. The inverter 16 converts a DC power supplied from the main battery 12 to an AC power and outputs the same to the rotating electrical machine MG. The rotating electrical machine MG generates kinetic energy for causing the vehicle to travel upon reception of the AC power output from the inverter 16. The rotating electrical machine MG converts kinetic energy generated when braking the vehicle and kinetic energy output from an engine (not illustrated) into electric energy. The inverter 16 converts an AC power (regenerated power) generated by the rotating electrical machine MG to a DC power, and supplies the same to the main battery 12. Accordingly, the main battery 12 is charged. A DC/DC converter may be provided between the inverter 16 and the main battery 12. The DC/DC converter described above reduces the voltage of power from the inverter 16 and outputs the power reduced in voltage to the main battery 12, and raises the voltage of the power from the main battery 12 and outputs the power raised in voltage to the inverter 16.

A voltage value and a current value of the main battery 12 are detected by a voltage sensor and a current sensor, respectively, (both are unillustrated) and are input to the controller 20. A temperature sensor 18 that detects a temperature (battery temperature Tb) of the main battery 12 is provided in the vicinity of the main battery 12. The temperature sensor 18 functions as a battery temperature acquiring unit that acquires the battery temperature Tb. The battery temperature Tb detected by the temperature sensor 18 is input to the controller 20. One or a plurality of the temperature sensors 18 may be provided. The plurality of temperature sensors 18, when provided, may be disposed at different positions.

The controller 20 computes a current SOC of the main battery 12 from the detected voltage value, current value, and battery temperature Tb. The SOC indicates a ratio of a current charge capacity with respect to a full charge capacity of the main battery 12. Hereinafter, the current SOC value obtained by computation is referred to as a "current charge value Cb."

The DC/DC converter 22 is also connected to the main battery 12. The DC/DC converter 22 is connected in parallel to the inverter 16. An auxiliary battery 24 and a heater 26 are connected to the DC/DC converter 22. The DC/DC converter 22 reduces the output voltage of the main battery 12, and supplies the power reduced in voltage to the auxiliary battery 24 and the heater 26. The operation of the DC/DC converter 22 is controlled by the controller 20.

The heater 26 is provided in the vicinity of the main battery 12, and constitutes the temperature raising mechanism that raises the temperature of the main battery 12. The heater 26 is driven by the power from the main battery 12. The power from the main battery 12 is reduced in voltage by the DC/DC converter 22, and is supplied to the heater 26. A temperature raising relay 28 is provided in a current route between the DC/DC converter 22 and the heater 26. The temperature raising relay 28 is switched between ON and OFF upon reception of a control signal from the controller 20. When the temperature raising relay 28 is turned ON, predetermined power is supplied from the DC/DC converter 22 to the heater 26, so that the heater 26 generates heat. When the heater 26 generates heat, the temperature of the main battery 12 rises. Driving of the temperature raising relay 28 is controlled by the controller 20.

The charging mechanism is also connected to the main battery 12. The charging mechanism is a mechanism that charges the main battery 12 by the power from an external power source 100 (external power), and includes a charging relay 34, a charger 30, and an inlet 32. The charging relay 34 is a relay provided between the charger 30 and the main battery 12, and is turned ON or OFF upon reception of the control signal from the controller 20. When the charging relay 34 is turned ON, power from the external power source 100 is supplied to the main battery 12, so that the main battery 12 is charged.

When the external power is an AC power, the charger 30 converts the AC power to a DC power. The inlet 32 is a connector which allows connection of a charging plug 102 provided on the external power source 100 (for example, a commercial power source). The controller 20 monitors a state of connection between the inlet 32 and the charging plug 102; that is, whether the vehicle is in a plug-in state in which the charging plug 102 is inserted into the inlet 32 or in a plug-out state in which the charging plug 102 is not inserted into the inlet 32.

A power detector 36 is connected between the charger 30 and the charging relay 34. The power detector 36 detects the maximum output power P of the connected external power source 100 in the plug-in state. The detected maximum output power P is output to the controller 20.

The controller 20 functions as a control unit that controls the charging mechanism described above, the temperature raising mechanism, and the like. The controller 20 includes a CPU 38 and a memory 40. The CPU 38 performs various computations. The memory 40 memorizes programs required for control, various preset control parameters, detected values detected by various sensors, and the like.

The external charging to be performed by the battery system 10 will be described below. When charging of the main battery 12 with the external power is desired, a user inserts the charging plug 102 of the external power source 100 into the inlet 32 of the vehicle to achieve the plug-in state. Once in the plug-in state, the controller 20 charges the main battery 12 by using the external power until the main battery 12 reaches a predetermined SOC.

In order to perform the external charging of the main battery 12, the controller 20 memorizes two threshold values; that is, a charge reference value C1 and a charge stop value C2, in the memory 40. The charge reference value C1 is an SOC value that may be recognized as being fully charged, and is, for example, a value of approximately 80%. The charge stop value C2 is a value including some surplus value a added to the charge reference value C1. In other words, the expression C2=C1+α is established. The surplus value a is set in advance in accordance with the capacity of the main battery 12 and the characteristics (for example, power consumption) of the heater 26. The surplus value a may be set to values that correspond to power consumed by the heater 26 for raising the temperature of the main battery 12, and the surplus value a may be, for example, several percent. During the external charging, the controller 20, in principle, starts a supply of power to the main battery 12 if the SOC (current charge value Cb) of the main battery 12 is not higher than the charge reference value C1, and stops the supply of power when the current charge value Cb reaches the charge stop value C2.

It is known that excessively low battery temperature Tb results in problems such as lowering of an output from the main battery 12 and reduction of a chargeable capacity. Therefore, the controller 20 also drives the heater 26 to raise the temperature of the main battery 12 when the battery temperature Tb is low. For raising the temperature of the main battery 12, the controller 20 memorizes two threshold values; that is, a temperature raising reference temperature Ts and a temperature raising stop temperature Te, in the memory 40. The temperature raising reference temperature Ts is a value set in accordance with the characteristics of the main battery 12 or the like, and may be set to values, for example, around 0° C. The temperature raising stop temperature Te is a value obtained by adding some hysteresis (several ° C., for example) to the temperature raising reference temperature Ts. The controller 20 starts raising the temperature when the temperature (battery temperature Tb) of the main battery 12 is lower than the temperature raising reference temperature Ts, and terminates the temperature raising when the battery temperature Tb reaches the temperature raising stop temperature Te.

Here, the charging process and the temperature raising process as described above are normally performed in parallel. However, in embodiments, in the low-power state in which the maximum output power P of the external power source 100 is lower than a prescribed reference power A, the temperature raising process is prohibited while the current charge value Cb is lower than the charge reference value C1 and the charging process is preferentially performed. The reason for this is as follows.

In general, the maximum output power P of the external power source 100 differs depending on the type of facility, country, region, and the like where the external power source 100 is installed. For example, the maximum output power P supplied from the external power source 100 is prescribed by a law of each country or private standards (for example, JEAC, etc.), and there are some countries in which the maximum output power P of the external power source 100 is low. In addition, there are many countries and regions in which power quality is low, and thus there is often a case where a nominal power is not supplied.

Figure 2:
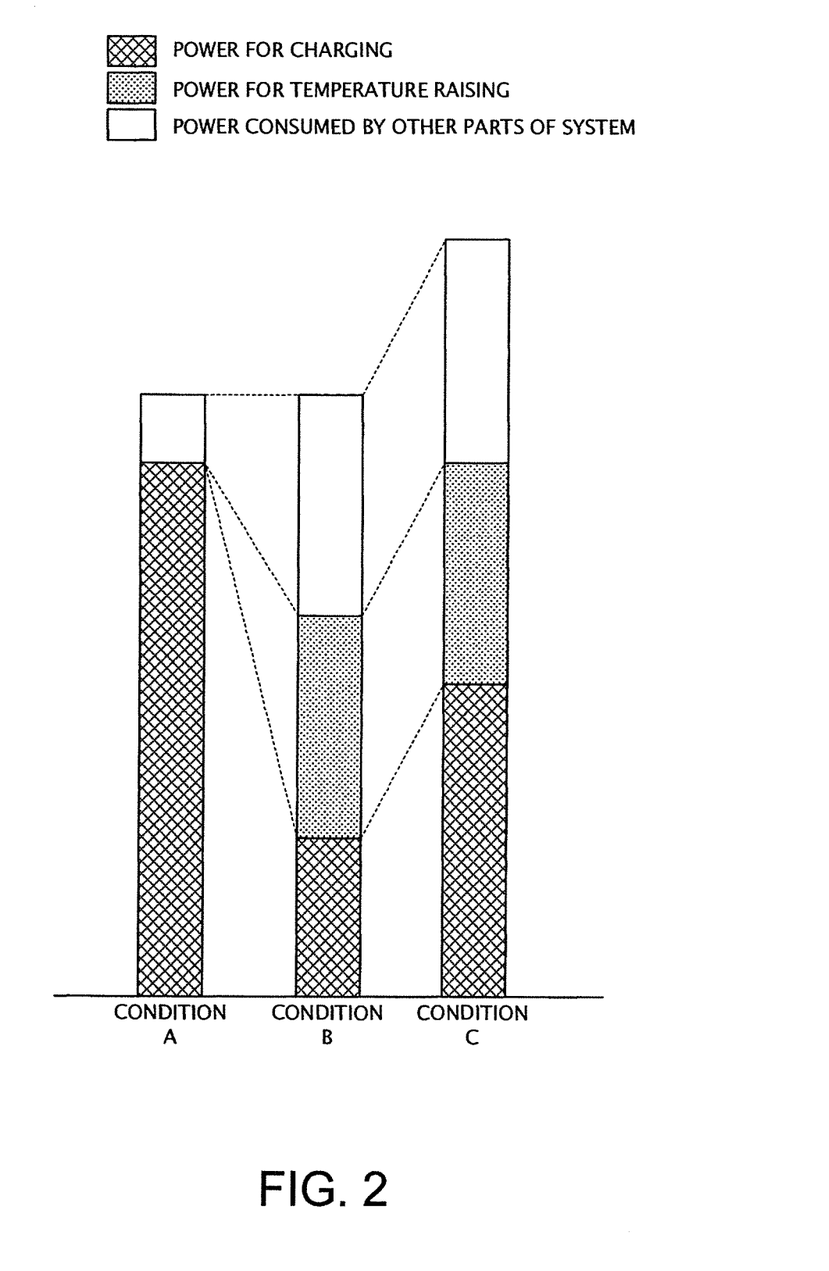
FIG. 2 is a drawing illustrating a difference in ratio of power consumption depending on a maximum output power.

In this manner, if the charging process and the temperature raising process are performed in parallel in the case where the maximum output power P of the external power source 100 is low, sufficient power for the charging process cannot be secured, and hence time required for completing the charging process may be significantly increased. This will be described with reference to FIG. 2. FIG. 2 is a drawing illustrating a difference in ratio of power consumption depending on the maximum output power P. In FIG. 2, Condition A shows a case where only the charging process is performed in the low-power state (P<A), Condition B shows a case where the charging and temperature raising processes are performed in parallel in the low-power state (P<A), and Condition C shows a case where the charging and temperature raising processes are performed in parallel in a normal power state (P≥A). In FIG. 2, blocks with cross-hatching indicate power to be consumed by the charging process, blocks with gray hatching indicate power to be consumed by the temperature raising process, and white blocks indicate power consumed by other parts of the system.

When the external charging is performed, power is supplied from the external power source 100 to the main battery 12. The power supplied from the external power source 100 does not change by whether or not the temperature raising process is performed. However, when the temperature raising process is performed during the external charging, a discharging amount from the main battery 12 increases. Therefore, a substantial chargeable power is reduced.

Here, as shown in Condition A, even in the low-power state (P<A), when the temperature raising process is not performed, power consumed for the temperature raising process is not necessary, and the power consumed by other parts of the system may also be reduced. Consequently, even in the low-power state, if the temperature raising process is not performed, sufficient power for the charging process is secured. In the normal power state (P≥A) as shown in Condition C, sufficient power for the charging process is secured even when the temperature raising and charging processes are performed in parallel.

However, as shown in Condition B, when the temperature raising process and the charging process are performed in parallel in the low-power state (P<A), power discharged from the main battery 12 is increased, and the substantial chargeable power is reduced. Consequently, sufficient power cannot be secured for the charging process, which eventually increases time for completing the charging process.

Here, when the plug-in connection is established, it is generally considered that the user wants to charge the main battery 12, but not raise the temperature. In embodiments, when it is determined that the maximum output power P of the external power source 100 is low and thus it is difficult to perform the charging process and the temperature raising process in parallel in a plug-in state, the charging process is performed first, and then the temperature raising process is started if the battery temperature is low after the SOC of the battery is sufficiently high.

Figure 3:
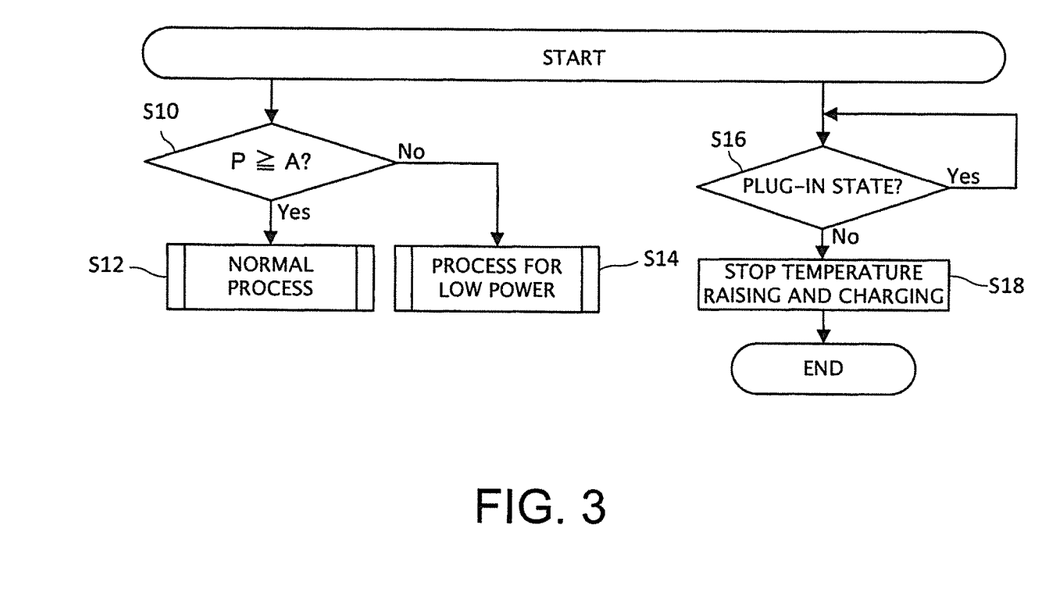
FIG. 3 is a flowchart illustrating a flow of charging and temperature raising processes when a plug-in connection is established.
Figure 4:
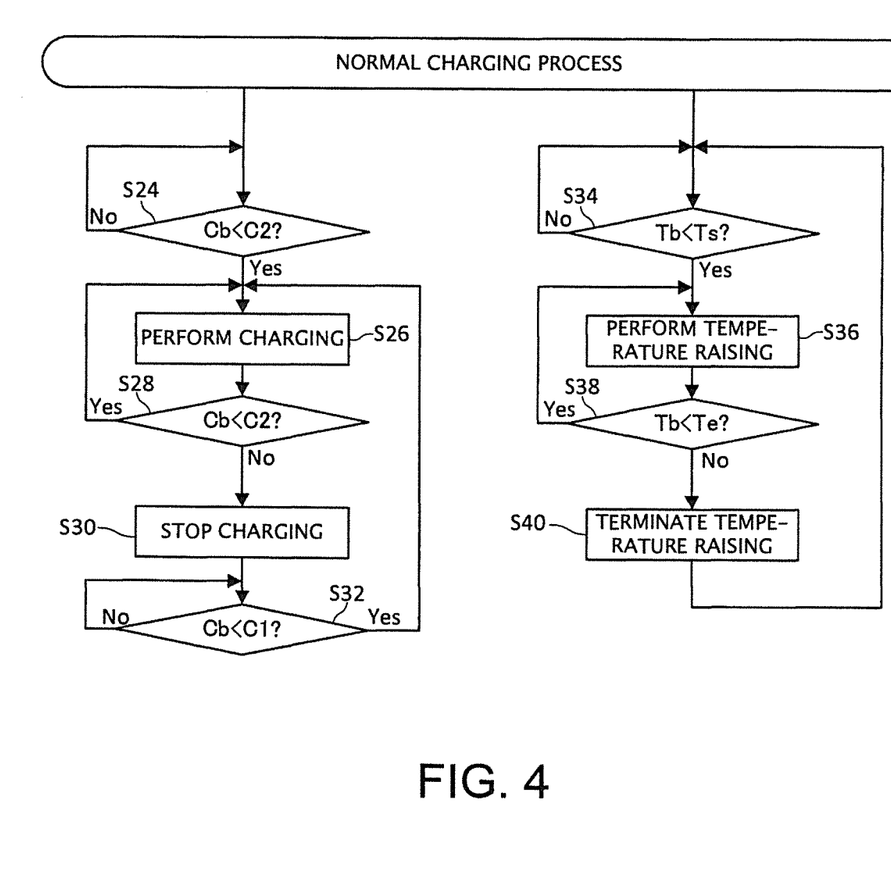
FIG. 4 is a flowchart illustrating a flow of a normal process.
Figure 5:
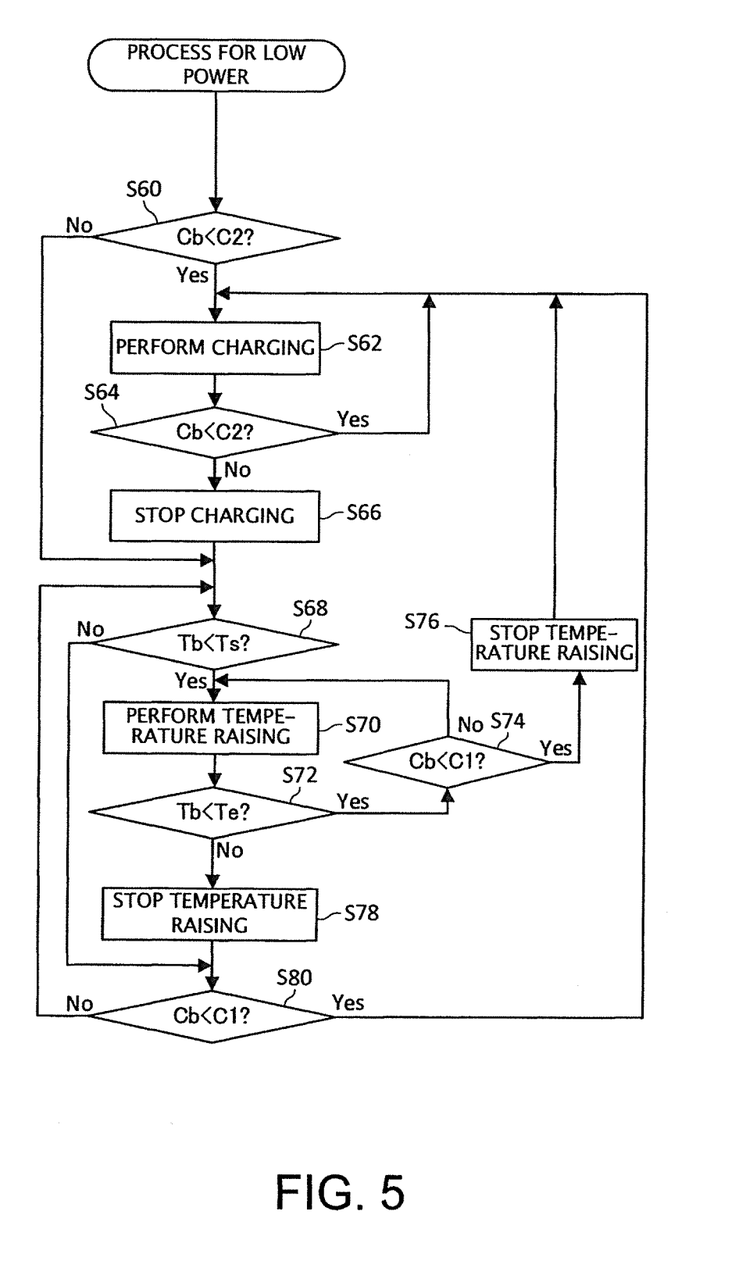
FIG. 5 is a flowchart illustrating a flow of a process for low power.

Referring now to FIG. 3 to FIG. 5, charging and temperature raising controls will be described. FIG. 3 is a flowchart illustrating a flow of the charging and temperature raising controls in the plug-in state. FIG. 4 is a flow chart illustrating a flow of a normal process in FIG. 3, and FIG. 5 is a flow chart illustrating a flow of a process for low power in FIG. 3.

The charging and temperature raising controls illustrated in FIG. 3 start when the plug-in state in which the charging plug 102 of the external power source 100 is inserted into the inlet 32 is established. In the plug-in state, the controller 20 compares the maximum output power P of the external power source 100 detected by the power detector 36 with the reference power A (S10). The reference power A here is a value preset in accordance with specifications required for the vehicle, the capacity of the battery, performances of the heater 26 (the power consumption of the heater 26, and the like), and the like. The reference power A may be set to a value that is capable of completing the charging process within a prescribed time, for example, even when the charging process and the temperature raising process are performed in parallel. If the maximum output power P is not lower than the reference power A as a result of comparison, the normal process (S12) is performed. In contrast, if the maximum output power P is lower than the reference power A, the process for low power (S14) is performed. In parallel to these processes, the controller 20 confirms whether the vehicle is in the plug-in state or not (S16). If it is confirmed that the vehicle is in the plug-out state, which is not the plug-in state (No in S16), the controller 20 stops the temperature raising and charging processes (S18), and terminates all the processes.

FIG. 4 is a flowchart illustrating a flow of the normal process. While the normal process is performed, the controller 20 performs two processes; that is, the charging process (S24 to S32) for the main battery 12 and the temperature raising process (S34 to S40) for the main battery 12, in parallel.

In the charging process, the SOC (current charge value Cb) of the main battery 12 is acquired first, and then the current charge value Cb is compared with the charge stop value C2 memorized in the memory 40 (S24). If the current charge value Cb is not lower than the charge stop value C2 as a result of comparison, it may be determined that the main battery 12 is sufficiently charged, and further charging process is not necessary. Therefore, in this case, the controller 20 does not start the charging process and waits. In contrast, when the current charge value Cb is lower than the charge stop value C2, the controller 20 starts the charging process of the main battery 12 (S26). In other words, the controller 20 turns the charging relay 34 ON to cause the external power to be supplied to the main battery 12. While the charging process is performed, the controller 20 acquires the SOC (current charge value Cb) of the main battery 12 periodically to compare the current charge value Cb with the charge stop value C2 (S28). If the current charge value Cb is lower than the charge stop value C2 as a result of comparison, the controller 20 continues the charging process.

In contrast, if the current charge value Cb is not lower than the charge stop value C2, the controller 20 stops the charging process (S30). In other words, the charging relay 34 is turned OFF and supply of the external power to the main battery 12 is stopped. After the charging process is stopped, the controller 20 detects the SOC (current charge value Cb) of the main battery 12 periodically, and the current charge value Cb is compared with the charge reference value C1 (S32). If the current charge value Cb is not lower than the charge reference value C1, the controller 20 waits as-is. In contrast, when a relation Cb<C1 is established, the controller 20 returns to Step S26, and restarts the charging process. Repeating the same processes from then onward maintains the SOC of the main battery 12 to a value not lower than the charge reference value C1.

Subsequently, the temperature raising process in the normal process will be described. In the temperature raising process, the controller 20 first compares the battery temperature Tb detected by the temperature sensor 18 with the temperature raising reference temperature Ts (S34). If the battery temperature Tb is not lower than the temperature raising reference temperature Ts as a result of comparison, the controller 20 determines that the temperature raising process is not necessary, and waits as-is. In contrast, when the battery temperature Tb is lower than the temperature raising reference temperature Ts, the controller 20 turns the heater 26 ON and starts raising the temperature of the main battery 12 (S36). In other words, the controller 20 turns the system main relay 14 and the temperature raising relay 28 ON to supply power from the main battery 12, which has been reduced in voltage by the DC/DC converter 22, to the heater 26. Accordingly, the heater 26 generates heat and the temperature of the main battery 12 rises.

When the temperature raising process is performed, the controller 20 compares the battery temperature Tb with the temperature raising stop temperature Te periodically (S38). If the battery temperature Tb is lower than the temperature raising stop temperature Te as a result of comparison, the controller 20 continues raising the temperature, and when the battery temperature Tb reaches the temperature raising stop temperature Te or higher, the controller 20 stops raising the temperature (S40). When the temperature raising process is stopped, the procedure goes back to Step S34, and the same processes are repeated.

Referring now to FIG. 5, a flow of the process for low power will be described below. In the low-power state in which the maximum output power P of the external power source 100 is low, the charging process of the main battery 12 is performed, and after the main battery 12 has been charged sufficiently, the temperature raising process is started. Therefore, in this case, the controller 20 detects the SOC (current charge value Cb) of the main battery 12 first, and then compares the current charge value Cb with the charge stop value C2 (S60). If the current charge value Cb is not lower than the charge stop value C2 as a result of comparison, the controller 20 determines that further charging process is not necessary. Therefore, the procedure goes to Step S68 to determine whether or not the temperature raising process is necessary.

In contrast, when the current charge value Cb is lower than the charge stop value C2, the controller 20 starts the charging process of the main battery 12 (S62). In other words, the controller 20 turns the charging relay 34 ON to cause the external power to be supplied to the main battery 12. While the charging process is performed, the controller 20 detects the SOC (current charge value Cb) of the main battery 12 periodically to compare the current charge value Cb with the charge stop value C2 (S64). If the current charge value Cb is lower than the charge stop value C2 as a result of comparison, the controller 20 continues the charging process. In contrast, if the current charge value Cb is not lower than the charge stop value C2, the controller 20 determines that the further charging process is not necessary, and stops the charging process (S66). In other words, the controller 20 turns the charging relay 34 OFF to stop the supply of the external power to the main battery 12.

If the main battery 12 is sufficiently charged, the controller 20 subsequently compares the battery temperature Tb with the temperature raising reference temperature Ts (S68). If the battery temperature Tb is lower than the temperature raising reference temperature Ts as a result of comparison, the controller 20 turns the heater 26 ON to start raising the temperature of the main battery 12 (S70). In other words, the controller 20 turns the system main relay 14 and the temperature raising relay 28 ON to supply the power from the main battery 12, which has been reduced in voltage by the DC/DC converter 22, to the heater 26.

When the temperature raising process is performed, the controller 20 compares the battery temperature Tb with the temperature raising stop temperature Te periodically (S72). If the battery temperature Tb is lower than the temperature raising stop temperature Te as a result of comparison, the controller 20 subsequently compares the current charge value Cb with the charge reference value C1 (S74). If the current charge value Cb is not lower than the charge reference value C1 as a result of comparison, the procedure goes to Step S70 to continue the temperature raising process as-is. In contrast, if the current charge value Cb is lower than the charge reference value C1, it may be determined that the further charging process of the main battery 12 is necessary. In this case, the controller 20 turns the heater 26 OFF to stop the temperature raising process (S76), and proceeds to Step S62 to restart the charging process (S62 to S66).

The reason why the current charge value Cb is monitored even during the temperature raising process in this manner is because power accumulated in the main battery 12 is consumed by performing the temperature raising process. If a relation Cb<C1 is established as a result of consumption of the accumulated power in the main battery 12 and a state which cannot be regarded as being "fully charged" is recognized, it means that the intention of the user who had made the plug-in connection is not achieved. Accordingly, in embodiments, the SOC of the main battery 12 is monitored even during the temperature raising process in the low-power state, and the temperature raising process is stopped if the current charge value Cb is lower than the charge reference value C1. In other words, in embodiments, the temperature raising process is prohibited in a state in which the current charge value Cb is lower than the charge reference value C1.

Referring again to the flow chart, description will be continued. If it is determined that the battery temperature Tb is not lower than the temperature raising stop temperature Te during the temperature raising process (No in S72), the controller 20 proceeds to Step S78 to stop the temperature raising process. Subsequently, the current charge value Cb is compared with the charge reference value C1 to determine whether or not the charging process is necessary (S80). If the current charge value Cb is lower than the charge reference value C1 as a result of comparison, the procedure goes to Step S62 to restart the charging process. In contrast, if the current charge value Cb is not lower than the charge reference value C1, the procedure goes to Step S68 to determine whether or not the temperature raising process is necessary. From then onward, the same processes are repeated until the plug-in connection is released.

Figure 6:
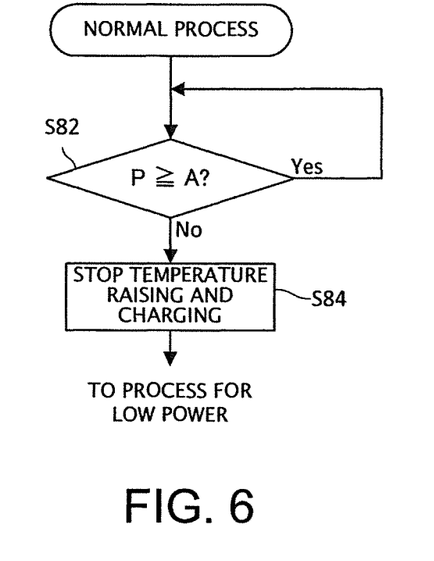
FIG. 6 is a flowchart illustrating a flow of an external power source monitoring process performed in the normal process.
Figure 7:
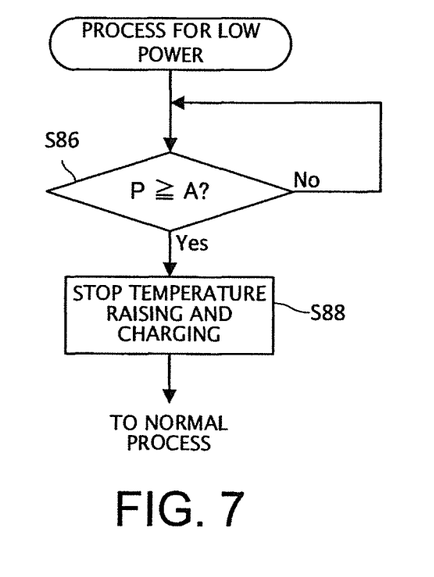
FIG. 7 is a flowchart illustrating a flow of an external power source monitoring process performed in the process for low power.

In the normal process and the process for low power, a process for monitoring the external power source 100 (S82 to S84 and S86 to S88) as illustrated in FIG. 6 and FIG. 7 may be performed in parallel to the charging process and the temperature raising process. FIG. 6 is a flowchart illustrating a monitoring process to be performed in parallel to the charging process (S24 to S32) and the temperature raising process (S34 to S40) in the normal process (FIG. 4). In this monitoring process, the controller 20 always monitors the maximum output power P (S82). If the maximum output power P is lower than the reference power A (No in S82), the charging process and the temperature raising process are stopped (S84), and the procedure goes to the process for low power (FIG. 5). FIG. 7 is a flowchart illustrating the monitoring process to be performed in parallel to the charging and temperature raising processes (S60 to S80) in the process for low power (FIG. 5). In this monitoring process as well, the controller 20 always monitors the maximum output power P (S86). If the maximum output power P is not lower than the reference power A (Yes in S86), the charging and temperature raising processes are stopped (S88), and the procedure goes to the normal process (FIG. 4).

In this manner, even after the procedure has gone to the normal process or the process for low power in the Step S10, the charging and temperature raising processes may be performed further adequately by monitoring the maximum output power P periodically. In other words, when supplied power is not stable in the countries or regions having a low power quality, the power state may change from the normal power state to low-power state or vice versa during the charging process. If the normal process is continued even though the power state is changed from the normal power state to the low-power state, sufficient power for the charging process is not secured, and time required for completing the charging process may be increased. Even though the power state is the low-power state at the time of the plug-in connection, if the state is recovered to the normal power state thereafter, it is desirable to make transition to the normal process for reducing time required for completing the charging process or the temperature raising process. Therefore, even after the transition to the normal process or to the process for low power in Step S10, the maximum output power P may be monitored periodically to switch the process to be taken in accordance with the maximum output power P.

Figure 8:
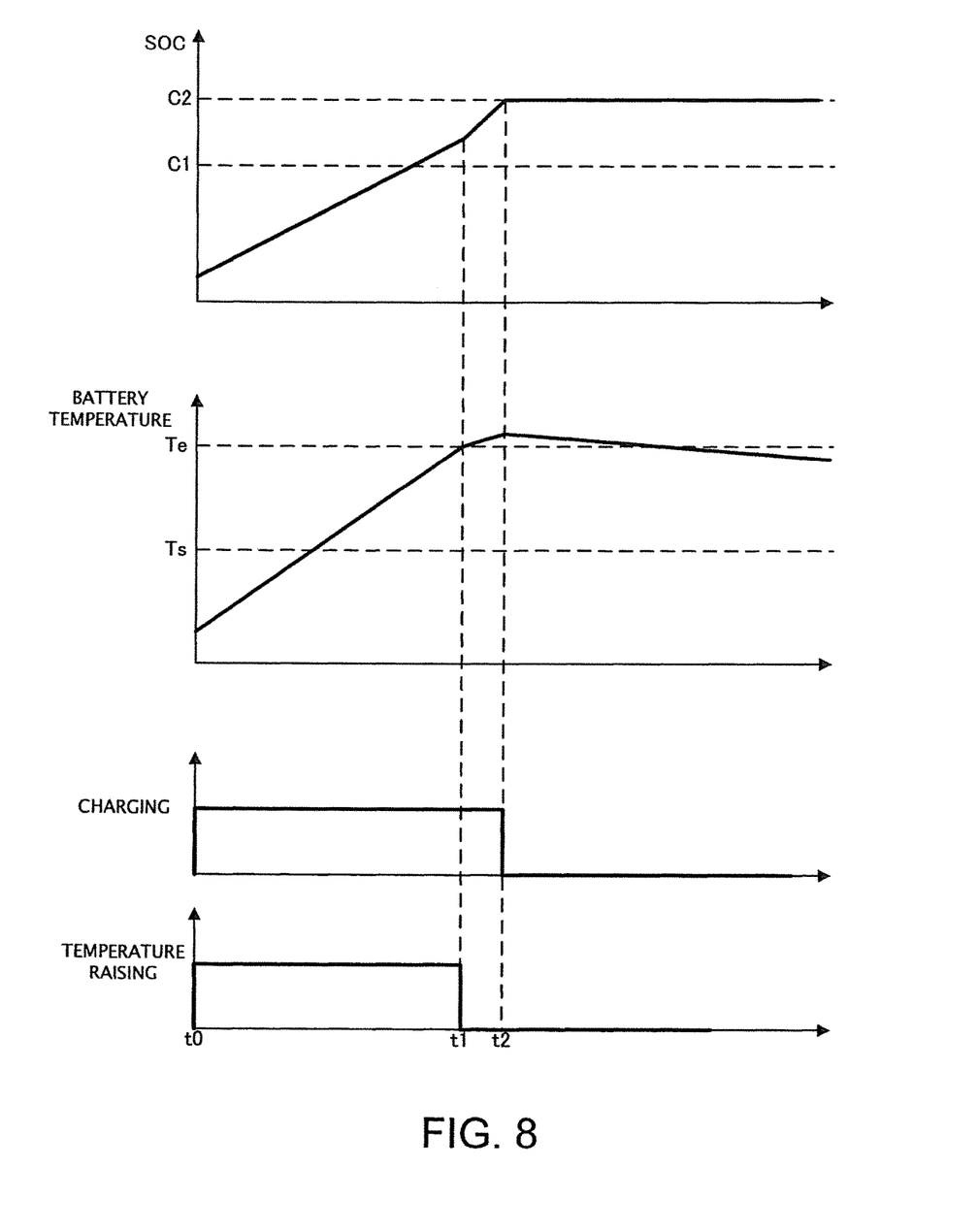
FIG. 8 is a drawing illustrating an example of the charging and temperature raising processes in a normal power state.
Figure 9:
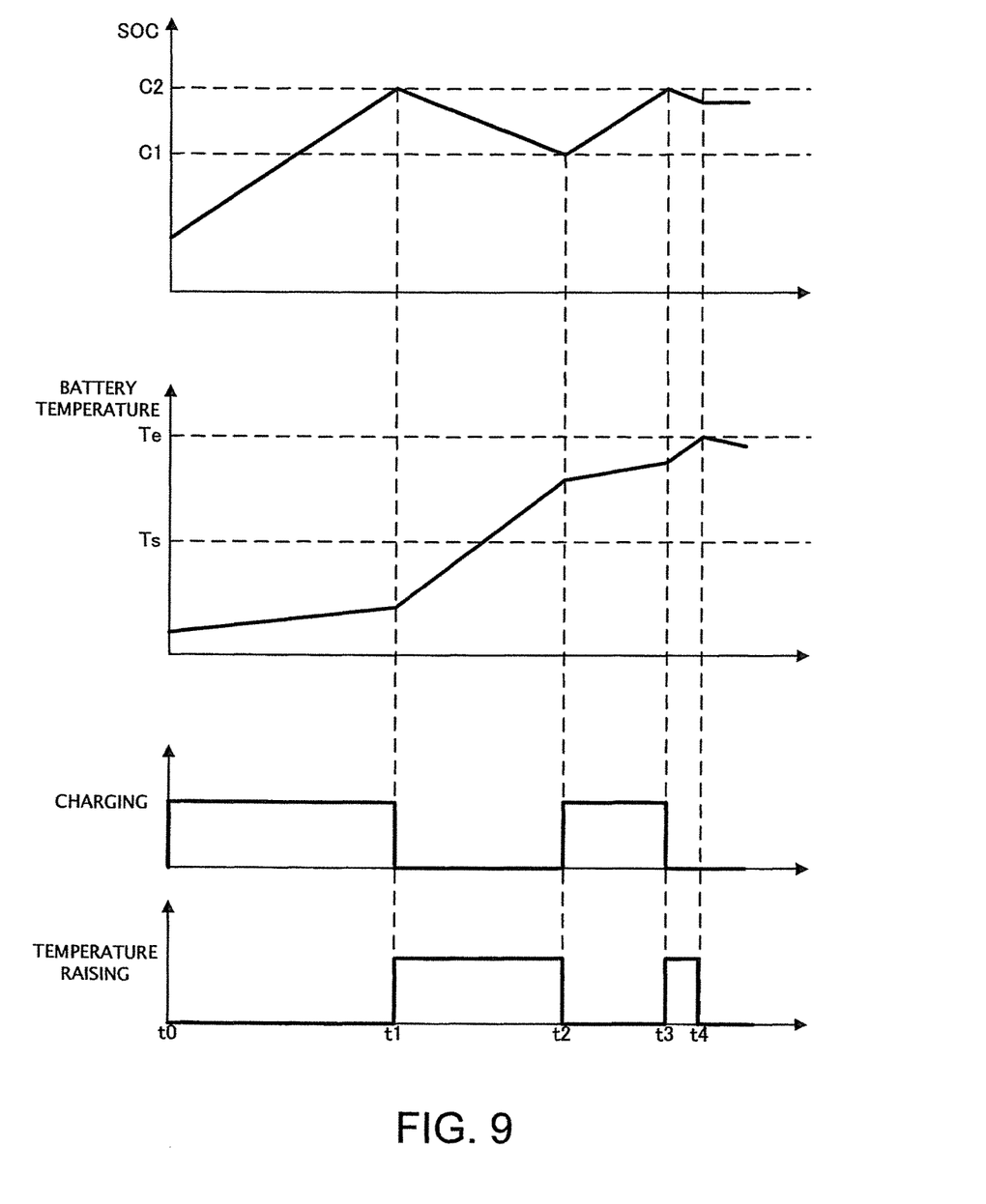
FIG. 9 is a drawing illustrating an example of the charging and temperature raising processes in a low-power state.

Referring now to FIG. 8 and FIG. 9, an example of the charging and temperature raising processes in the plug-in state will be described. FIG. 8 is a drawing illustrating an example of the charging and temperature raising processes in the normal power state (P≥A). In FIG. 8, it is assumed that the charging plug 102 is inserted into the inlet 32 at time t0. The SOC (current charge value Cb) of the battery at the time t0 is assumed to be sufficiently lower than the charge stop value C2, and the battery temperature Tb is assumed to be sufficiently lower than the temperature raising reference temperature Ts. In this case, the controller 20 starts both of the charging and temperature raising processes at the time t0. By starting the temperature raising process, the battery temperature Tb gradually rises. By starting the charging process, the current charge value Cb also gradually rises. However, at this time, since the temperature raising process is performed in parallel to the charging process, the rising rate of the current charge value Cb is relatively low. Subsequently, if the battery temperature Tb reaches the temperature raising stop temperature Te at time t1, the controller 20 stops the temperature raising process. In contrast, since the current charge value Cb does not reach the charge stop value C2, the controller 20 continues the charging process. At this time, since the temperature raising process is stopped, the amount of discharge from the main battery 12 is reduced, so that the rising rate of the current charge value Cb is improved. If the current charge value Cb reaches the charge stop value C2 at time t2, the charging process is also stopped. From then onward, the controller 20 monitors the battery temperature Tb and the current charge value Cb, and performs the charging process if the current charge value Cb is lower than the charge reference value C1, and restarts the temperature raising process if the battery temperature Tb is lower than the temperature raising reference temperature Ts.

Referring now to FIG. 9, an example of the charging and temperature raising processes in the low-power state (P<A) will be described below. In FIG. 9 as well, it is assumed that the charging plug 102 is inserted into the inlet 32 at the time t0 in the same manner as in FIG. 8. The SOC (current charge value Cb) of the battery at the time t0 is assumed to be sufficiently lower than the charge stop value C2, and the battery temperature Tb is assumed to be sufficiently lower than the temperature raising reference temperature Ts. In the case of the low-power state, the controller 20 starts the charging process first. By performing the charging process, the current charge value Cb gradually rises. If the main battery 12 is charged, the battery temperature Tb slightly rises by heat generation of the electrical cells 12a themselves.

When the current charge value Cb reaches the charge stop value C2 at the time t1, the controller 20 stops the charging process and, on the other hand, starts the temperature raising process. By starting the temperature rising process, the battery temperature Tb gradually rises. Since the power is used for the temperature raising process, the SOC (current charge value Cb) of the main battery 12 is gradually reduced.

When the current charge value Cb is reduced to a level lower than the charge reference value C1 at the time t2, the controller 20 stops the temperature raising process and restarts the charging process even though the battery temperature Tb does not reach the temperature raising stop temperature Te. When the current charge value Cb is reduced to a level below the charge reference value C1 in this manner, the temperature raising process is stopped and the charging process is restarted irrespective of the battery temperature Tb, so that the main battery 12 may be maintained constantly in the fully charged state (Cb≥C1). Consequently, the intention of the user who has performed the plug-in connection; that is, the requirement of the user to charge the main battery 12, may always be satisfied.

By restarting the charging process, when the current charge value Cb reaches the charge stop value C2 at time t3, the controller 20 stops the charging process and restarts the temperature raising process. If the battery temperature Tb reaches the temperature raising stop temperature Te at time t4 as a result of the temperature raising process, the controller 20 stops the temperature raising process. At this time, since power is consumed by the temperature raising process, the value of the current charge value Cb is lower than the charge stop value C2, but is larger than the charge reference value C1, which may be recognized as being fully charged. Therefore, the controller 20 does not perform recharging, and waits as-is.

As is clear from the description thus far, in the process for low power, the temperature raising process is prohibited while the SOC of the main battery 12 is lower than the charge reference value C1, and the charging process is preferentially performed. In other words, the priority is always given to the charging process until the fully charged state (Cb≥C1), which the user wants, is achieved. Consequently, even in the low-power state in which the maximum output power P is low, the intention of the user to "fully charge the main battery" is achieved in a relatively early stage, and once the intention (fully charged state) is achieved, the state of achievement of the intention may be maintained.

In embodiments, in the low-power state, the performance of the temperature raising process is permitted only after the main buttery has charged until the current charge value Cb reaches the charge stop value C2, which is higher than the charge reference value C1. By charging the main battery in advance to the charge stop value C2 in this manner, the surplus power required for the temperature raising process may be secured.

In embodiments, in the low-power state, the temperature raising process is stopped and restarts the charging process when the current charge value Cb is lowered to a level below the charge reference value C1, which may be recognized to be fully charged, in association with the performance of the temperature raising process. Consequently, the current charge value Cb may be prevented from being reduced to the level of the charge reference value C1 or below, which may be recognized to be fully charged.

In embodiments, in the normal power state, the charging process and the temperature raising process are performed in parallel. Consequently, in the case of the normal power state, both of the temperature raising and charging processes of the main battery 12 may be completed rapidly.

The configurations described thus far are exemplary only, and so long as the charging process is performed and the temperature rising process is prohibited while the relation Cb<C1 is established in the low-power state, other configurations may be modified as needed. For example, in embodiments, when the temperature raising process is performed in the low-power state (Steps S70 to S74 in FIG. 5), the charging process is stopped. However, so long as the temperature raising process is prohibited while the relation Cb<C1 is established, the temperature raising and charging processes may be performed in parallel while the relation Cb≥C1 is established.

In embodiments, once the main battery is charged to the charge stop value C2, the charging process is not restarted so long as the current charge value is reduced to a level below the charge reference value C1. However, the main battery may be charged to the charge stop value C2 after the battery temperature Tb has been increased to the temperature raising stop temperature Te. In other words, after the temperature raising process has been stopped in Step S78 in FIG. 5, the procedure may go to Step S60 instead of Step S80. In this configuration, a state in which the surplus power a required for the temperature raising process is secured may be maintained in addition to the charge reference value C1 which may be recognized to be fully charged.

Although power is supplied from the main battery 12 to the heater 26 when the temperature raising process is performed in embodiments, power may be supplied from the external power source 100 directly (without the intermediary of the main battery 12) to the heater 26.

The invention claimed is:

1. A battery system including a vehicle-mounted battery that supplies power to a rotary electrical machine for traveling and is rechargeable by external power supplied from an external power source, the battery system comprising:
   a power detection mechanism that detects output power from the external power source in a plug-in state in which the external power source is connected to the vehicle-mounted battery;
   a charging mechanism that charges the vehicle-mounted battery by the external power;
   a temperature raising mechanism that raises a temperature of the vehicle-mounted battery to a temperature not lower than a prescribed reference temperature; and
   a control unit that controls the charging mechanism and the temperature raising mechanism, wherein
   in a low-power state in which the output power detected by the power detection mechanism is lower than a prescribed reference power, the control unit prohibits a temperature raising process by the temperature raising mechanism with an SOC of the vehicle-mounted battery lower than a prescribed charge reference value, and causes the charging mechanism to perform a charging process.

2. The battery system according to claim 1, wherein
in the low-power state, the control unit causes the charging mechanism to charge the vehicle-mounted battery until the SOC of the vehicle-mounted battery reaches a charge stop value which is higher than the charge reference value, and then if the temperature of the vehicle-mounted battery is lower than the reference temperature, causes the temperature raising mechanism to start the temperature raising process.

3. The battery system according to claim 2, wherein
in the low-power state, if the SOC of the vehicle-mounted battery is lowered to a level below the charge reference value during the temperature raising process by the temperature raising mechanism, the control unit stops the temperature raising process by the temperature raising mechanism, and charges the vehicle-mounted battery to the charge stop value by the charging mechanism.

4. The battery system according to claim 2, wherein
the control unit charges the vehicle-mounted battery by the charging mechanism after completion of the temperature raising process by the temperature raising mechanism until the SOC of the vehicle-mounted battery reaches the charge stop value.

5. The battery system according to claim 3, wherein
the control unit charges the vehicle-mounted battery by the charging mechanism after completion of the temperature raising process by the temperature raising mechanism until the SOC of the vehicle-mounted battery reaches the charge stop value.

6. The battery system according to claim 1, wherein
the control unit performs the charging process by the charging mechanism and the temperature raising process by the temperature raising mechanism in parallel in a normal power state in which the output power detected by the power detection mechanism is not lower than the reference power.

7. The battery system according to claim 2, wherein
the control unit performs the charging process by the charging mechanism and the temperature raising process by the temperature raising mechanism in parallel in a normal power state in which the output power detected by the power detection mechanism is not lower than the reference power.

8. The battery system according to claim 3, wherein
the control unit performs the charging process by the charging mechanism and the temperature raising process by the temperature raising mechanism in parallel in a normal power state in which the output power detected by the power detection mechanism is not lower than the reference power.

9. The battery system according to claim 4, wherein
the control unit performs the charging process by the charging mechanism and the temperature raising process by the temperature raising mechanism in parallel in a normal power state in which the output power detected by the power detection mechanism is not lower than the reference power.

10. The battery system according to claim 5, wherein
the control unit performs the charging process by the charging mechanism and the temperature raising process by the temperature raising mechanism in parallel in a normal power state in which the output power detected by the power detection mechanism is not lower than the reference power.

* * * * *

UNITED STATES PATENT AND TRADEMARK OFFICE
CERTIFICATE OF CORRECTION

PATENT NO. : 9,987,932 B2
APPLICATION NO. : 15/354019
DATED : June 5, 2018
INVENTOR(S) : Murata et al.

It is certified that error appears in the above-identified patent and that said Letters Patent is hereby corrected as shown below:

In Column 5, Line 58, delete "value a" and insert --value α--, therefor.

In Column 5, Line 60, delete "value a" and insert --value α--, therefor.

In Column 5, Line 62, delete "value a" and insert --value α--, therefor.

In Column 5, Line 65, delete "value a" and insert --value α--, therefor.

In Column 13, Line 17, delete "power a" and insert --power α--, therefor.

Signed and Sealed this
Seventeenth Day of July, 2018

Andrei Iancu
*Director of the United States Patent and Trademark Office*